(12) United States Patent
Raj

(10) Patent No.: US 6,411,424 B1
(45) Date of Patent: Jun. 25, 2002

(54) INTEGRATED LASER ARRAY DEVICES

(75) Inventor: Kannan Raj, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/663,602

(22) Filed: Sep. 18, 2000

(51) Int. Cl.[7] .......................... G02B 26/00; G02B 27/10
(52) U.S. Cl. ........................ 359/291; 359/627
(58) Field of Search ............................... 359/290, 291, 359/115, 123, 124, 239, 245, 248, 627; 372/20, 23, 26, 96, 97, 108

(56) References Cited

U.S. PATENT DOCUMENTS

| | | | | |
|---|---|---|---|---|
| 5,115,444 A | * | 5/1992 | Kirkby et al. ............... 55/294 |
| 5,206,920 A | * | 4/1993 | Cremer et al. ............... 385/37 |
| 5,351,262 A | * | 9/1994 | Poguntke et al. ............ 372/102 |
| 5,379,310 A | * | 1/1995 | Papen et al. .................... 372/23 |
| 5,960,133 A | * | 9/1999 | Tomlinson .................... 385/18 |
| 6,208,679 B1 | * | 3/2001 | Sanchez-Rubio et al. ..... 372/92 |
| 6,236,771 B1 | * | 5/2001 | Aoki et al. ...................... 385/2 |

OTHER PUBLICATIONS

Kannan Raj and Werner Metz, "Optical Serial Link", U.S. patent application Ser. No. 09/690,548, Oct. 17, 2000.

* cited by examiner

*Primary Examiner*—Georgia Epps
*Assistant Examiner*—Gary O'Neill
(74) *Attorney, Agent, or Firm*—Trop, Pruner & Hu, P.C.

(57) ABSTRACT

An integrated laser multiplexer may be formed of an integrated laser array which produces a plurality of light beams of different wavelengths. The light beams of different wavelengths may be reflected by an elliptical reflector and a dispersive element for transmission over a single optical fiber.

29 Claims, 6 Drawing Sheets

INTEGRATED LASER ARRAY DEVICES

BACKGROUND

This invention relates generally to wavelength division multiplexing.

Wavelength division multiplexing (WDM) is an optical communication technique that leverages the enormous bandwidth of an optical fiber. A WDM system may include a plurality of laser light sources, conventionally implemented by laser diodes that produce a plurality of wavelength separated data streams. The independent data streams are then multiplexed together on a single output fiber. Allowing multiple WDM channels to coexist on a single fiber, one can tap into the huge available fiber bandwidth with data rates exceeding several tens of gigabits per second.

A multi-wavelength light source emits light at precisely determined wavelengths with a precisely determined inter-wavelength spacing. Discrete laser sources and small arrays of sources are commercially available. Laser outputs of different wavelengths may be made available from a single chip. The light beams of multiple wavelengths may ultimately be combined for transmission over a single-mode fiber. Such an approach provides an integrated solution that reduces packaging cost while improving performance.

An integrated laser array may be formed of a multiple wavelength InGaAsP/InP strained multi-quantum well (MQW) gain-coupled distributed-feedback (DFB) laser array including several ridge waveguide lasers with ridge widths from 1.5 to 5 micrometers. See "Multi-Ridge Waveguide Gain-Coupled DFB Laser Array," by G. P. Li et al., JLT, Vol. 13, No. 2 pp. 196–199 (1995).

Even with an integrated laser array, a separate multiplexer is utilized to couple the different light beam wavelengths into a single mode fiber. This increases the packaging costs and necessarily results in insertion losses. Given sufficient numbers of multiplexers and de-multiplexers, significant power losses may result in large optical networks.

Thus, there is a need for better ways to couple integrated laser light sources to multi-mode fibers.

DETAILED DESCRIPTION

Figure 1:
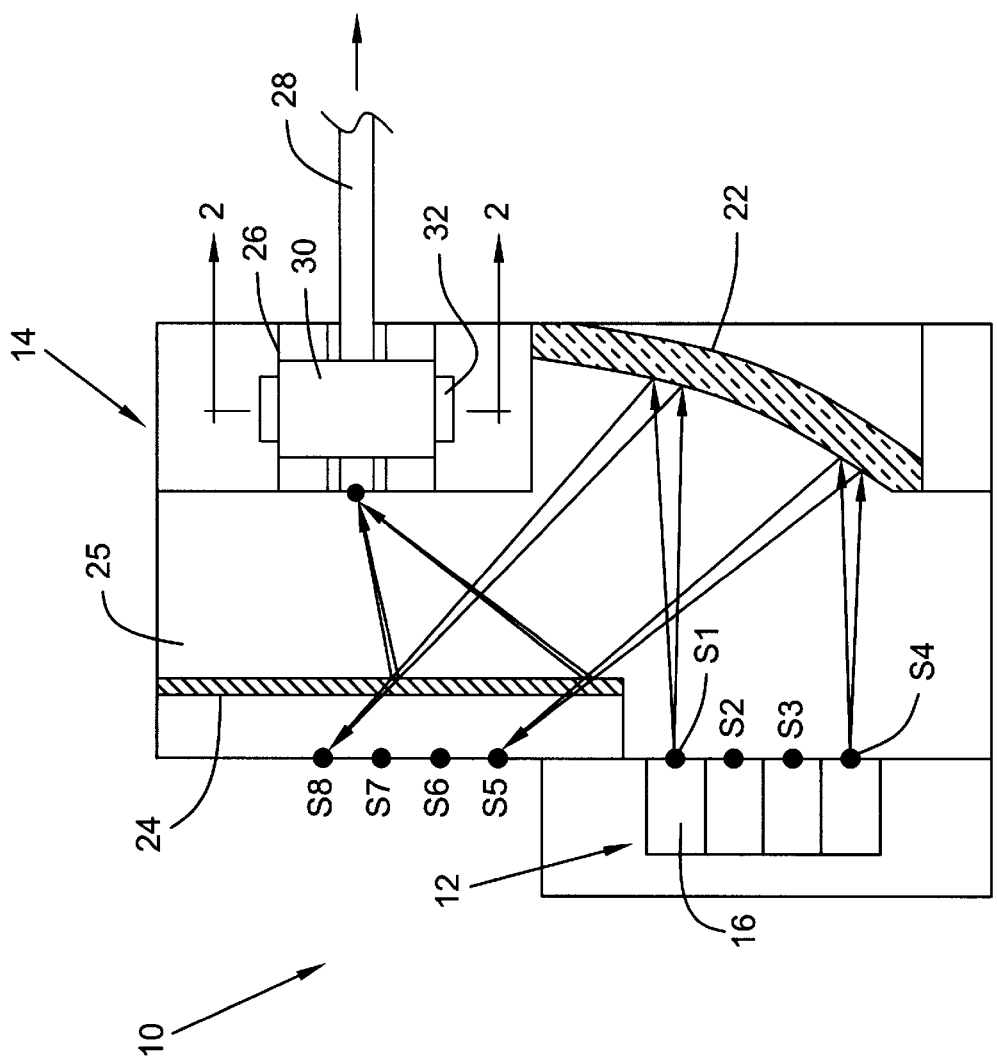
FIG. 1 is a schematic depiction of one embodiment of the present invention.

Referring to FIG. 1, an integrated laser array multiplexer 10 includes an integrated laser array 12 integrated with an elliptical reflector system 14 that couples light beams generated by the integrated laser array 12 to a single multi-mode output fiber 28. The laser array 12 may use a multi-wavelength InGaAsP/InP strained multi-quantum well (MQW) gained-coupled DFB laser, for example as described in the aforementioned article by G. P. Li et al.

However, the present invention is not limited to any particular integrated laser array. Embodiments of the present invention may utilize closely spaced integrated laser arrays that produce a plurality of light beams of accurately spaced wavelengths from a single die or substrate 20 such as a ceramic substrate.

The laser array 12 may be integrated or integrally connected to a reflector system 14 that includes an elliptical reflector 22. Each of the wavelength specific light beams generated by the laser array 12 is reflected by the elliptical reflector 22. The light beams, generated at the foci S1, S2, S3, or S4 of the elliptical reflector 22, are reflected toward corresponding or conjugate focal points S5, S6, S7, and S8. Of course, the number of light beams and the precise orientation of the elliptical reflector 22 is subject to considerable variability. The present invention is not limited to a specific orientation of an elliptical reflector 22 or to the use of a specific number of wavelengths.

In accordance with conventional geometry, any light beam issuing from a focus of the elliptical reflector 22 is reflected to a conjugate focus of the elliptical reflector 22, regardless of the orientation and direction of the light beam. Thus, a one-to-one imaging and coupling may be created between the light array 12 issuing the light beams through foci Sl to S4 and the light directed towards the conjugate foci S5 to S8.

A dispersive element 24, such as a reflection phase grating, a thin film dielectric grating or a prism, contributes to the creation of multiple foci S1 through S4. The dispersive element 24 may be positioned optically between the reflector 22 and an output fiber 28.

Laser beams may be oriented at two or more of the multiple foci S1, S2, etc. produced by the dispersive element 24 enabling the creation of an integrated laser array multiplexer 10. That is, each of the light beams of a different wavelength, created by the laser array 12, may be reflected by the reflector 22 from a first plurality of multiple foci S1–S4 towards a second plurality of conjugate foci S5–S8. However, before reaching the second set of conjugate foci, the light beams are reflected by the dispersive element 24 to a common focal point that corresponds to the end of the optical fiber 28.

As a result, the multiple wavelengths produced by the laser array 12 are multiplexed onto the single output fiber 28. This may be done with relatively low insertion losses using a compact arrangement, as illustrated in FIG. 1, in some embodiments of the present invention.

In some embodiments, the individual laser diodes 16 forming the array 12 may be positioned relatively closely together. The Bragg wavelength spacing between neighboring wavelengths within the laser array 12 is partially determined by the effective index of a refraction and the increment delta lambda in the grating periods. Once the wavelength spacing is established, the dispersive element 24 and the spacing between the individual laser beams in the array 12 can be determined using known grating equations and ray tracing.

With a constant wavelength spacing, the optical wavelength comb generated by the laser array 12 can then be moved as a group by adjusting the heat sink temperature to match the wavelength comb used in the system 10. The lasing wavelength of a DFB laser typically red-shifts at a rate of approximately 1 A/° C. (12.5 GHz/° C. at 1.55 micron wavelength region) resulting from the temperature dependence of the waveguide effective refractive index.

An optical block 25 may include a substantially transparent block of material. The elliptical reflector 22 may be placed at a predetermined location or locations on the block 25. The block 25 may, for example, be made of borosilicate. The dispersive element 24 may then be patterned on an edge of the optical block 25, in accordance with one embodiment of the present invention. The block 25 thickness, the dispersive element 24 grating parameters and the ellipticity of the elliptical reflector 22 may be determined by the array 12 wavelengths and wavelength spacing. Ray tracing and known grating equation formulations may be used to position these elements. Aligning the optical block 25 to the laser array 12 and receiving the optical fiber 28 may be facilitated by the use of fiducial marks on the laser substrate 20, the optical block 25, and the support 30 for the optical fiber 28.

Figure 2:
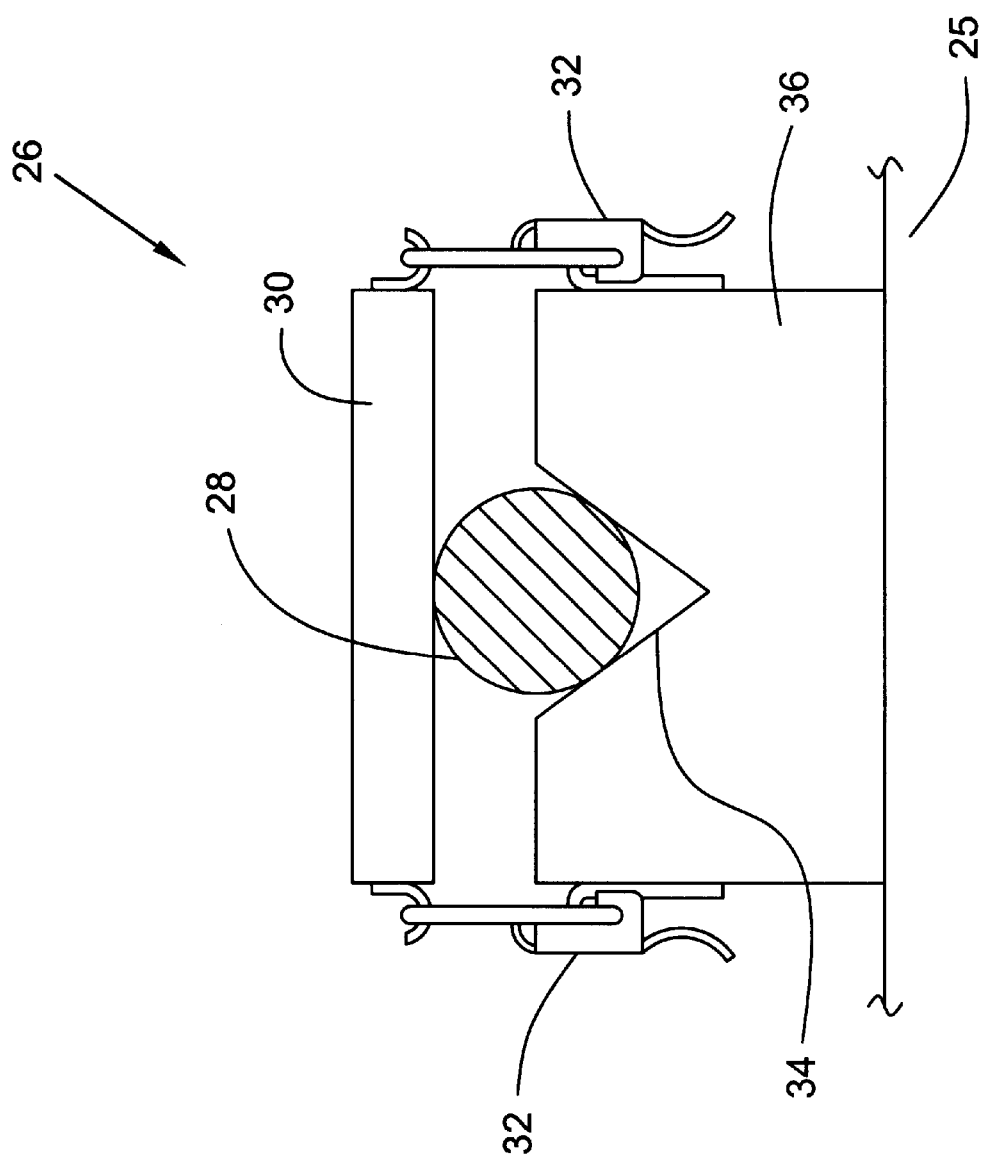
FIG. 2 is an enlarged cross-sectional view taken generally along the line 2—2 in FIG. 1.

The optical block 25 may hold the elliptical reflector 22 and a securement system 26 for the optical fiber 28. As shown in FIG. 2, the securement system 26 includes a top plate 30 clamped to a support 36 by a pair of securement devices 32 that may be clamps as one example. Each securement device 32 engages the top plate 30 and pulls it downwardly causing the optical fiber 28 to be sandwiched between the top plate 30 and the support 36, in a V-shaped groove 34.

The V-shaped groove 34 may be etched into the surface of the support 36. The support 36 may be made of silicon or thermo-plastic material as examples. The x and y alignment of the fiber 28 is controlled by placing the fiber 28 on the V-shaped groove 34. The V-shaped groove 34 is centered in alignment with the conjugate foci S5–S8 relative to the dispersive element 24. The height of the V-shaped groove 34 is compatible with the diameter of the optical fiber 28 to be coupled.

The optical block 25 provides for accurate location of the output fiber 28. Additionally, the reflector 22 is held by the optical block 25 so that the major axis of the reflector 22 is coincident with the laser light input and the minor axis is perpendicular to the midpoint of the foci. The optical block 25 may include a pair of mating halves in some embodiments. The optical block 25 may also provide a stop or end point for accurately positioning the end of the optical fiber 28.

The elliptical reflector 22 may be a reflective ellipsoid or conic section placed on one side of the optical block 25. The reflector 22 may be secured with adhesive to the optical block 25. The elliptical reflector 22 may be made by replication of a diamond turned master or by injection molding to manufacture in high volumes. Aluminum, silver, or gold coating may be applied to the reflector 22 to create a highly reflecting surface. While fixed positioning of the elliptical reflector 22 is illustrated in FIG. 1, the reflector 22 may be adjustable for precise alignment of the reflector 22 with the dispersive element 24 and the laser array 12.

Figure 3:
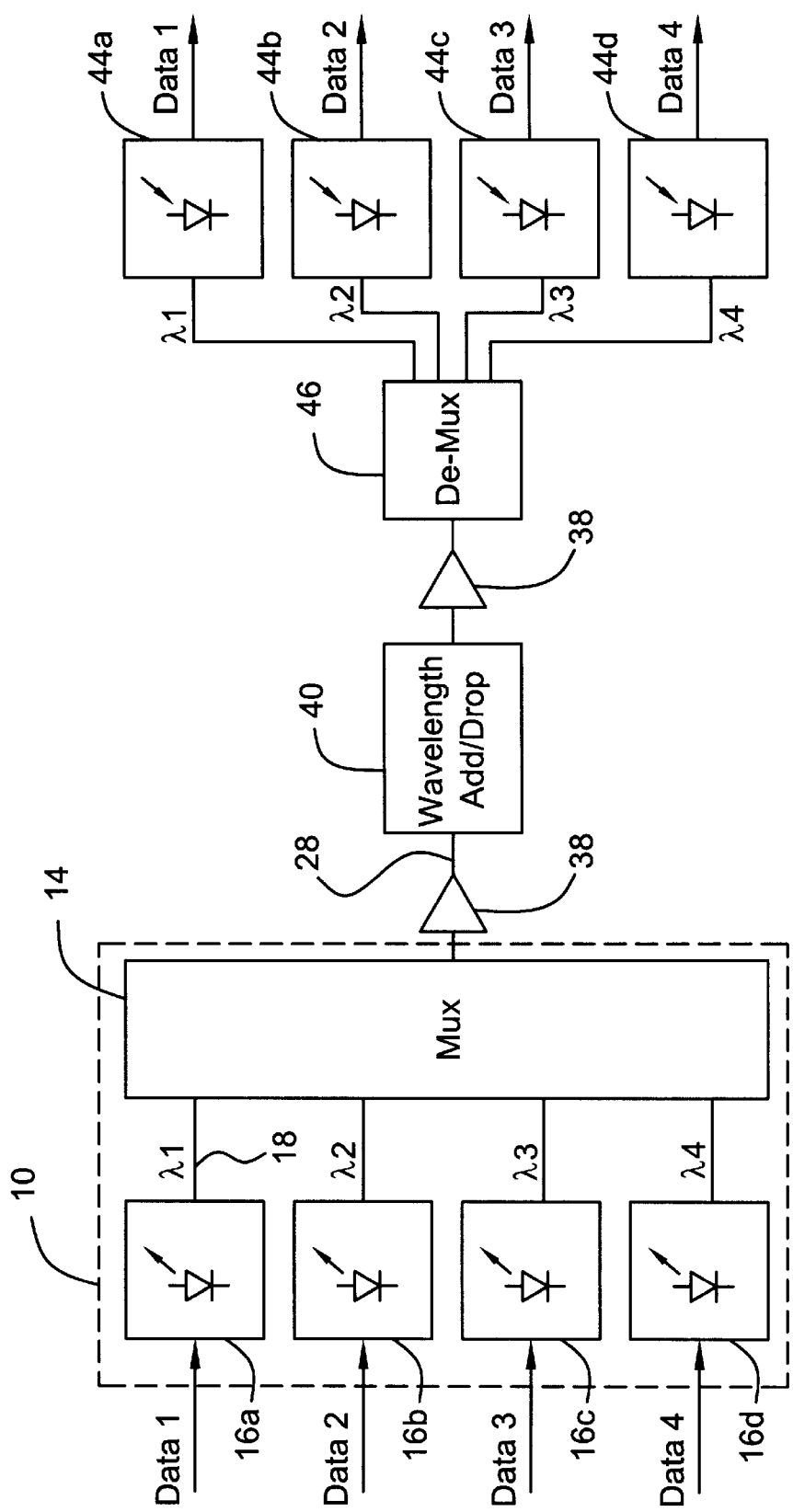
FIG. 3 is a system schematic diagram for one embodiment of the present invention.

Referring next to FIG. 3, a wavelength division multiplexing system may include an integrated laser array multiplexer 10 including the reflector system 14, made up of the elliptical reflector 22 and dispersive element 24, and the array of laser diodes 16a through 16d, each integrated with the reflector system 14 and securement systems 26. Each of the diodes 16 produces a light beam 18 of a different wavelength that is then reflected by the reflector 22 and the dispersive element 24 for transmission over a single optical fiber 28. Thus, two or more signals with different wavelengths are launched on the same optical fiber and are separated at the output end of the fiber 28 by a de-multiplexer 46.

For example, a four channel WDM system may use a WDM multiplexer that combines four independent data streams, each of a unique wavelength generated by one of the four laser diodes 16. The WDM multiplexer creates four output data channels over a signal line 28. Each channel carries light of a different wavelength lambda 1 through lambda 4. An erbium-doped fiber amplifier 38 compensates for fiber losses. A wavelength addition or dropping unit 40 may be situated on the line 28 together with an additional preamplifier 38. The unit 40 allows a channel to be added or removed. The de-multiplexer 46 at the fiber receiver end separates out the four data streams lambda 1 through lambda 4 on the single line 28. Light detectors 44 may convert the light energy into electrical signals.

Figures 4, 4A:
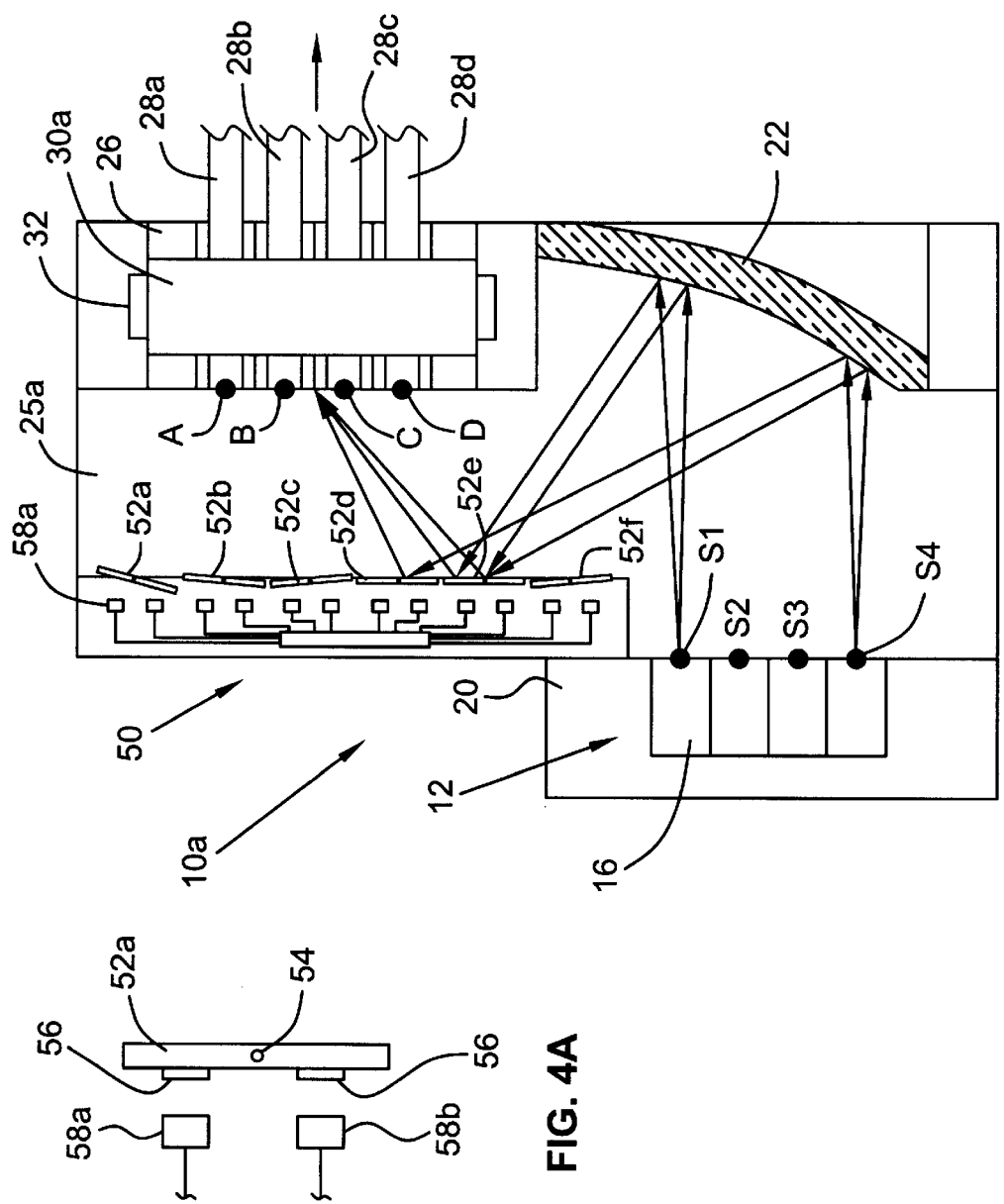
FIG. 4 is a schematic depiction of an alternate embodiment of the present invention.
FIG. 4A is a partial, enlarged depiction of a portion of the embodiment as shown in FIG. 4.

Referring to FIG. 4, a laser array multiplexer 10a includes an integrated add/drop unit 50. The unit 50 enables the laser array multiplexer 10a to selectively include one or more of the available channels produced by the laser array 12. Moreover, it may enable one or more channels to be multiplexed on the same or different output fibers such as the fibers 28. That is, in an embodiment in which four channels are generated, each of a different wavelength, by the laser array 12, each of the channels may be placed on a separate output fiber 28a, 28b, 28c or 28d. Alternatively, all the channels may be multiplexed on any one of the available optical fibers 28. In still another alternative, any combination of available channels may be placed on any combination of available output fibers. For example, two channels may be placed on each of two output fibers. In addition, an available channel may simply be discarded if desired.

The add/drop unit 50 may include a plurality of microelectromechanical structures (MEMS) 52. Each of the structures 52 pivots around at least one (if not more) axes. In the illustrated embodiment, each MEMS 52 may be tilted outwardly at the top, outwardly at the bottom or be maintained relatively untilted to vary the angle of reflection of light beams reflected by the reflector 22. The MEMS 52 may be arranged in a one or two dimensional array.

Referring to FIG. 4A, each MEMS 52, such as the MEMS 52a, includes a pivot 54 that mounts the MEMS 52 for pivotal rotation under control of two contacts 58a and 58b. Mating contacts 56 are provided on the backside of each MEMS 52. Thus, by placing appropriate charges on a contact 58a or 58b, the contacts 56a or 56b may be attracted or repelled to adjust the angular orientation of the MEMS 52. The signals provided to the contacts 58a and 58b may be provided from an integrated circuit 60 that generates signals of appropriate timing to implement user selected combinations of output signals for particular fibers 28.

Each of the fibers 28 may be mounted on V-shaped grooves and held between a top plate 30a and support 36 by clamps 32. Thus, a plurality of grooves 34 hold a plurality of output fibers 28 clamped between a top plate 30 and a support 36. In this way, the focal point of any given fiber indicated as A, B, C or D may be the target of a particular MEMS 52 whose position is controlled by the integrated circuit 60.

Figure 4B:
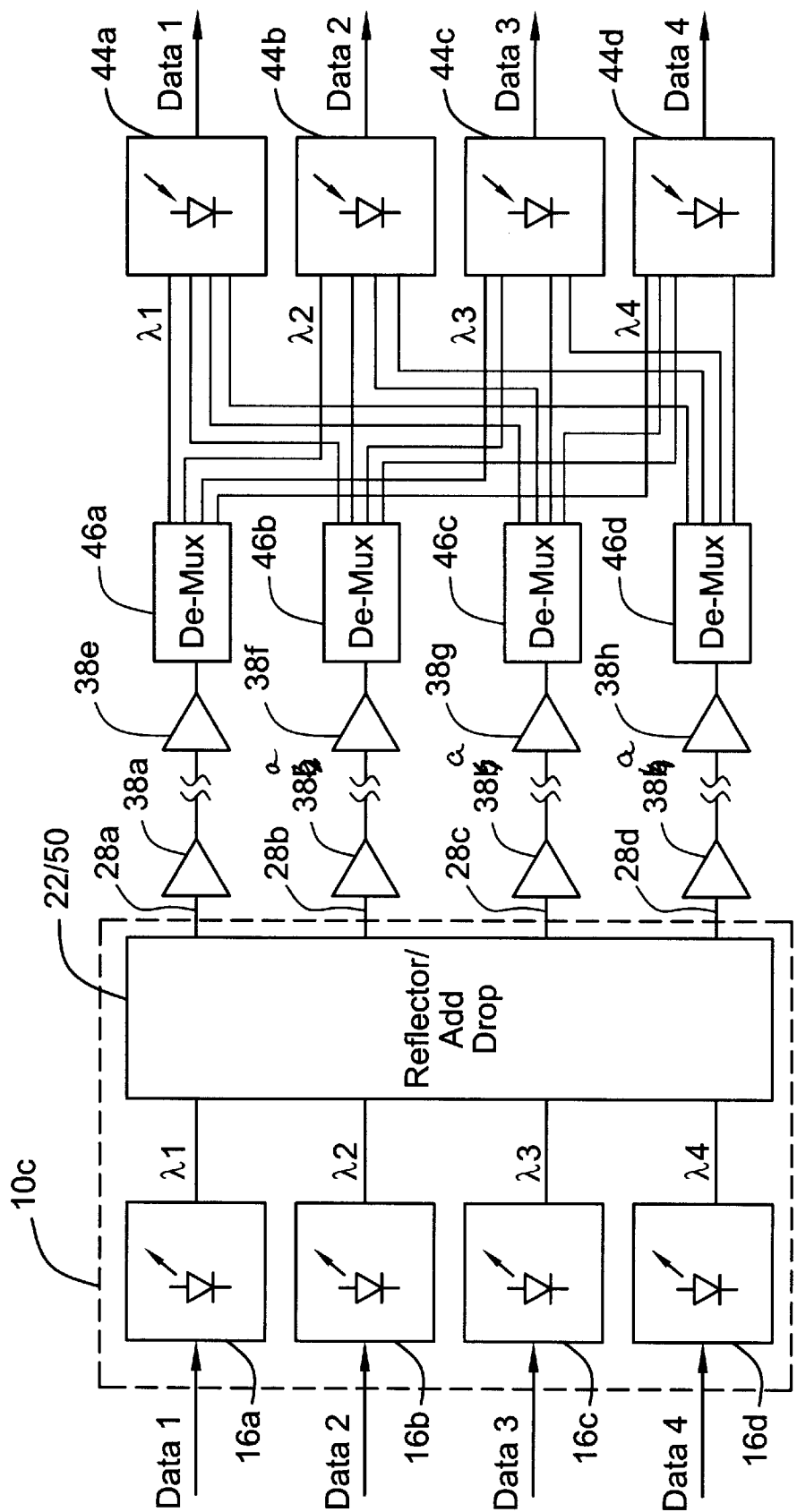
FIG. 4B is a system schematic diagram for another embodiment of the present invention.

Thus, referring to FIG. 4B, the WDM system may correspond to that shown in FIG. 3 with the exception that the wavelength add/drop 50 is now integrated with the reflector system 14 and the laser array 12.

In this case, an erbium doped amplifier 38a may be associated with each optical fiber 28, such as the erbium doped amplifier 38a associated with the optical fiber 28a. In addition, a separate demultiplexer 46a may be associated with each optical fiber 28. On the receiving end of each optical fiber 28, another erbium doped amplifier 38 (such as the amplifier 38e) may be provided together with a demultiplexer 46. Each demultiplexer 46 may provide one or more output channels from a single or multiplexed input channels.

Figures 5, 5A:
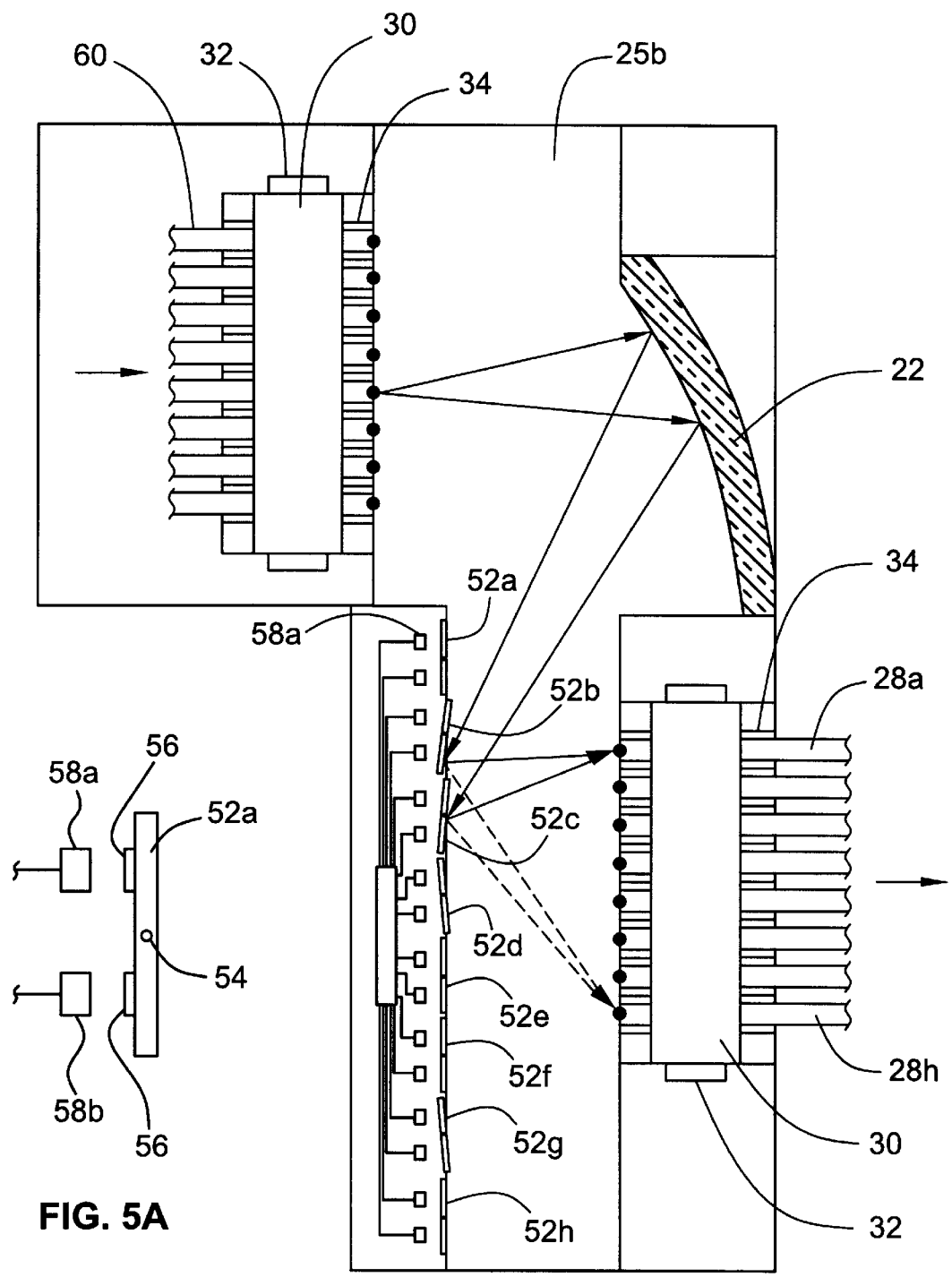
FIG. 5 is a schematic depiction of still another embodiment of the present invention.
FIG. 5A is a partial, enlarged depiction of a portion of the embodiment shown in FIG. 5.

Referring to FIG. 5, a router includes a plurality of input fibers 60 secured within a securement system including the clamps 32, the top plate 30 and a plurality of V-shaped grooves 34. Thus, each of a plurality of optical fibers 60 may be held beneath the top plate 30 with the free end of each fiber 60 abutted against an optical block 25b. The block 25b may be a substantially transparent block in one embodiment of the present invention.

Each of the free ends of the fibers 60 (eight of which are shown in FIG. 5) define a focus of a elliptical reflector 22 also secured to the optical block 25b. The reflector 22 reflects light from each and every one of the fibers 60 towards a MEMS 52 including a plurality of mirrors 52a in a number equal to the number of fibers 60. In other words, each fiber 60 has a corresponding mirror 52a through 52h assigned to it. Thus, each fiber 60 controls or routes each output signal from a given fiber 60 to a given output fiber 28a through 28h. The output fibers 28 also include a securement system including the clamps 32, the V-shaped grooves 34 and the top plate 30, which together collectively secure a plurality of output fibers 28 with their free ends abutted against the optical block 25b.

In this way, the ultimate disposition of each channel on each fiber 60 may be controlled by the MEMS 52 to specifically direct or route each input channel to a particular output fiber 28. This arrangement allows shifting of a group of wavelengths on one set of channels to another set of channels while adding or dropping one or more channels in a selective manner. A relatively high precision, compact arrangement is possible in some embodiments.

While the mirrors 52 are shown in a one dimensional arrangement, two dimensional arrays of MEMS may also be utilized in some embodiments. By integrating the router with the other components, relatively compact and potentially low loss arrangements are possible.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A laser array multiplexer comprising:
   a laser array that produces at least two light beams of different wavelengths;
   an elliptical reflector aligned with said array to reflect said light beams; and
   a dispersive element aligned with said elliptical reflector to reflect said beams towards at least one focal point.

2. The multiplexer claim 1 including a support that supports said laser array, said elliptical reflector and dispersive element as a unit.

3. A laser array multiplexer comprising:
   a laser array that produces at least two light beams of different wavelengths;
   an elliptical reflector aligned with said array to reflect said light beams;
   dispersive element aligned with said elliptical reflector to reflect said beams toward at least one focal point; and
   a support that supports the laser array, said elliptical reflector and said dispersive element as a unit, said support includes an optical block that optically couples said laser array, said elliptical reflector and said dispersive element.

4. The multiplexer of claim 3 wherein said optical block is a transparent solid block of material.

5. The multiplexer of claim 4 including a securement system for securing an output fiber to said support.

6. The multiplexer of claim 5 wherein said securement system is arranged to align an end of an optical fiber with said focal point.

7. The multiplexer of claim 1 wherein said laser array is a multi-quantum well gain-coupled distributed feedback laser array.

8. The multiplexer of claim 1 wherein said dispersive element is selected from the group consisting of a reflection phase grating, a thin film dielectric grating or a prism.

9. The multiplexer of claim 1 wherein said dispersive element is aligned to deflect a plurality of beams of different wavelengths onto a single fiber.

10. The multiplexer of claim 1 wherein said dispersive element is a micro-electromechanical structure including a plurality of mirrors.

11. The multiplexer of claim 10 wherein said beams are directed to at least two different focal points by said micro-electromechanical structure.

12. The multiplexer of claim 11 wherein said micro-electromechanical structure includes a plurality of mirrors whose angle of tilt is selectively controllable.

13. A method comprising:
   receiving at least two light beams of different wavelengths;
   reflecting said light beams from an elliptical reflector; and
   reflecting said light beams from said elliptical reflector towards at least one focal point.

14. The method of claim 13 including reflecting said light beams from said elliptical reflector to at least two focal points.

15. A method comprising:
   receiving at least two light beams at different wavelengths;
   reflecting said light beams from an elliptical reflector;
   reflecting said light beams from said elliptical reflector towards at least one focal point; and
   securing an optical fiber having an end and securing said end at said focal point.

16. The method of claim 15 including securing said optical fiber in a V-shaped groove and clamping said fiber in said V-shaped groove.

17. The method of claim 13 wherein reflecting said beams from said elliptical reflector includes reflecting said beams using a micro-electromechanical structure including a plurality of mirrors.

18. The method of claim 17 including reflecting said beams from said elliptical reflector to a plurality of focal points.

19. The method of claim 18 including aligning an optical fiber at each of said focal points.

20. The method of claim 13 including forming a multiplexer including an add/drop unit integrally included in said multiplexer.

21. The method of claim 13 including generating at least two light beams of different wavelengths from a distributed feedback laser array.

22. The method of claim 13 including receiving said light beams of different wavelengths from two different optical fibers.

23. A wavelength division multiplexing system comprising:
   a multiplexer including a distributed feedback laser array that generates at least two beams of different wavelengths; and
   an optical system that focuses said beams onto a single focal point, said optical system including an elliptical reflector.

24. The system of claim 23 wherein said optical system includes an integrated add/drop unit.

25. The system of claim 23 wherein said optical system includes an elliptical reflector.

26. The system of claim 23 including a dispersive element arranged between said single focus point and said elliptical reflector.

27. The system of claim 23 wherein said optical system includes a micro-electromechanical structure including a plurality of mirrors.

28. A router comprising:
   a multiplexer including a distributed feedback laser array that generates at least two beams of different wavelengths; and
   a micro-electromechanical structure that selectively focuses said beams onto one or more of a plurality of output channels; and
   an elliptical reflector that receives said beams from said array and reflects said beams to said micro-electromechanical structure.

29. A router comprising:
   a multiplexer including a distributed feedback laser array that generates at least two beams of different wavelengths;
   a micro-electromechanical structure that selectively focuses said beams onto one or more of a plurality of output channels; and
   a controller and said structure includes a plurality of mirrors, said controller controls the orientation of said mirrors in said electromechanical structure to select the output channel for each of said beams.

* * * * *